Patented Oct. 20, 1931

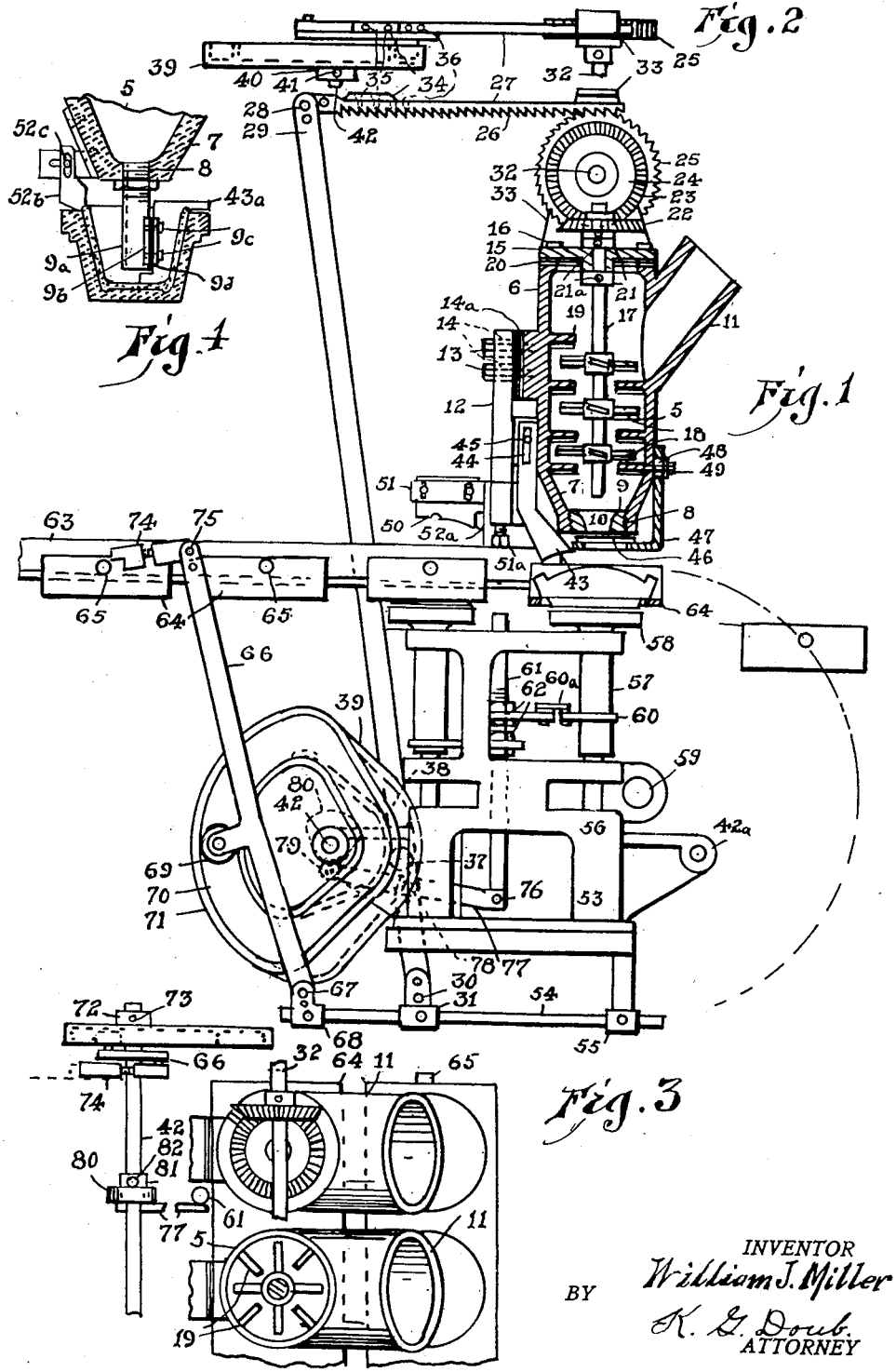

1,827,759

UNITED STATES PATENT OFFICE

WILLIAM J. MILLER, OF SWISSVALE, PENNSYLVANIA

METHOD OF AND APPARATUS FOR FEEDING AND FORMING PLASTIC MATERIAL IN THE MANUFACTURE OF POTTERY

Application filed January 13, 1927. Serial No. 160,997.

This invention relates to an improved method and means for feeding plastic material to molds in the manufacture of pottery.

The present application embodies subject-matter also disclosed in my prior Patents Nos. 1,703,316; 1,739,981 and 1,769,528.

In the present invention the charge of plastic material is extruded directly into or on the mold and segregated and preformed by means which may be combined with, or attached to, the extruding means and cooperating with the latter and means for raising and lowering and rotating the molds, the charge being extruded, preformed and jiggered in but two positions of the mold-carrying means.

One object of the present invention therefore is to provide a combined extruding and preforming means in mechanism of this class.

Another object of the invention is to provide a novel method and means for severing or segregating and preforming charges of plastic material.

A further object of the invention is to generally simplify the structure of feeder mechanism for pottery forming machines.

The present feeder mechanism may be used with an automatic jigger such, for instance, as is disclosed in my prior Patents Nos. 1,750,762 and 1,757,132. However, any suitable type of jigger as well as mold-carrying means or conveyor may be used, or these operations may be performed manually.

It is proposed to use any number of units as desired and arranged in parallel or in series, or in parallel and series, to feed any number of molds simultaneously or approximately simultaneously by merely extending the frame and such operating parts as are necessary to accommodate the additional units.

In the drawings:

Figure 1 is a side elevation, partly in section, of a preferred form of mechanism embodying the features of my invention.

Fig. 2 is a top plan view of a preferred means for imparting rotation to the feed blades of the container.

Fig. 3 is a broken plan view, partly diagrammatic, showing the manner of connecting two or more units in parallel and also the mounting of the cams.

Fig. 4 is a sectional view of a structure which may be adopted for use with deep molds.

The numeral 5 designates a container, which may be of any preferred form but is here shown as cylindrical, having side walls 6, which are preferably straight to within a short distance of the lower extremity of the container, where they incline inwardly or converge, as at 7, and form the lower truncated open end of the container. The lower open end of the container has inner screw threads 8, for removable and adjustable application of an orifice member 9, having an opening 10 therethrough. Orifice members having openings varying in size and shape may be inserted in the lower screw-threaded open end of the container as desired. Plastic material may be conveyed to the container 5 through a chute 11, opening into one side of the upper extremity thereof. The container 5 is preferably adjustably secured to a part of the frame 12 of the mechanism by means of screw-bolts 13, extending through enlarged openings 14, formed in the frame, shims 14$^a$ being provided for lateral adjustment of the container.

The container is preferably closed by a top or cover 15, suitably secured thereto by screw-bolts 16, and extending through the top or cover 15 downwardly into the container is a shaft 17, having feed blades 18 suitably secured thereon and cooperating with reversely inclined ribs 19, which may be formed integral with the wall of the container, to progressively feed the plastic material downwardly and compact and form it into a homogenous mass and extrude it through the orifice opening 10. The shaft 17 may be adjusted vertically by means of annular shims or washers 20, between the top or cover 15 and upper edge of the container, suitable thrust or bearing collars 21 being adjustably mounted on said shaft as by screws 21$^a$ above and below the top or cover 15. Adjustably mounted on the upper extremity of the shaft 17 is a bevel gear 22, meshing with bevel teeth 23, formed on the one side of a gear 24 near the outer periphery thereof, the latter also having inclined teeth 25 on its outer periphery which mesh with reversely inclined teeth 26 on a ratchet bar 27, adjustably pivoted at one extremity as at 28 to the upper extremity of a bar or lever 29, which extends downwardly and is also adjustably pivoted at its lower extremity, as at 30, to an extension 31 of the lower supporting frame of the mechanism. The gear 24 is suitably secured on a shaft 32, which will be of such extent as to accommodate the number of units that may be employed in parallel relation and may be mounted in bearings at opposite sides of the frame of the machine or be rotatably mounted in a bearing bracket 33, suitably attached to the top or cover 15, and which also may extend up over the ratchet bar 27 and form a guide-way for the said bar to prevent lateral play or displacement thereof. To impart a slight reverse rotation to the feed blades 18 and thereby retract or raise the plastic material in the container 5 and from the orifice opening 10, I prefer to adjustably mount a block 34 on top of the ratchet bar 27, this block having downwardly inclined or beveled extremities and secured by a screw or screws 35 in any one or more of a number of screw holes 36 formed along the top surface of the bar 27, so that the block may be adjusted along the said bar to prevent unmeshing of the teeth 26 and 25 for varying distances and in turn vary the degree of reverse rotation of the feed blades and consequently the degree of retraction of the plastic material. Generally speaking, the foregoing structure may be found in my prior patents hereinbefore noted and more specifically described.

The bar lever 29 preferably has rotatably mounted on one side thereof along its lower intermediate extent a cam roller 37, moving in a cam track 38, formed in a cam wheel or disk 39, adjustably secured as by the hub 40 and screw 41 on a main drive shaft 42, which may be rotatably mounted in a supporting bracket 42ª and of such length as to accommodate the number of units in use and be driven by suitable power means. The shape or contour of the cam track 38 is such that when the cam 39 rotates, a feeding rotation will be imparted to the shaft 17 with its screw blades 18 through the connections heretofore described, to extrude a predetermined charge or batch of plastic material through the orifice opening 10.

To preform the charge of plastic material, I prefer to employ a preforming member 43, which may be shaped along the lines of the usual profile at its lower extremity, and at its upper extremity may be adjustably mounted by means of a slot 44 and screw 45 on a part of the frame 12 at one side of the container 5.

It may be desirable to use some form of severing means or cutter to assist in segregating the charge or to prevent the neck portion of the charge from twisting in the orifice opening 10 and also ensure a definite point of severance. I have therefore shown a preferred form of cutter at 46, comprising either one or a number of wires, which may be mounted in the yoke extremity of a bracket 47, adjustably secured to the container 5 by means of a slot 48 and screw 49. By loosening the screw 49, the cutter may be adjusted in a vertical direction relatively to the orifice opening 10.

To perform the final or jiggering operation, I prefer to use a profile and trimmer assembly of the form illustrated in my Patent No. 1,757,132, above noted, but this structure may be varied as required and found necessary to adapt it to the article of pottery being manufactured. This profile and trimmer assembly may be readily understood by referring to my above patent and a general description thereof should suffice. The assembly generally comprises a profile 50, adjustably mounted on a support 51, the support and profile being slidable vertically in guides attached to a bracket, which may be adjustably secured to a part of the frame. The support is limited in its downward movement by a stop plate and moves upwardly against the tension of a spring. A trimmer 52ª is adjustably mounted on a suitable holder, not shown, to cooperate with the profile 50. The profile support 51 has an adjustable screw-bolt 51ª inserted in the lower portion thereof, which is adapted to intermittently contact with a pitman 61 to raise and lower the profile in timed relation to mechanism for shifting the molds.

Any suitable type of conveyor may be used as well as means for raising and rotating and lowering the chucks and spindles, or jiggering means, or, as hereinbefore noted, these operations could be performed manually, the structure herein shown being simply for the purpose of illustration.

In the present instance 53 generally indicates a jigger frame, which may be adjustably mounted on supporting bars or rails 54, as at 55, the said frame having pivot bearings 56, which rotatably receive spindles 57, terminating in chucks 58. An independent motive means 59 is preferably provided for each spindle and may be operatively and adjustably connected by suitable flexible members or driving belts and cone pulleys, or the motor may be directly connected with the spindle and regulated as to speed by suitable rheostats, as will be understood. Each spindle is preferably provided with an annular channeled or grooved portion or neck which fits into one extremity of a cross head or fork 60, the other extremity of the cross fork being adjustably connected by shims and bolts as at 60ª to a similar cross fork, which in turn is adjustably mounted on the pitman 61, as by nuts 62, so that each spindle may be separately adjusted in a vertical direction.

The conveyor shown preferably comprises the track 63, along which the trays 64 in which the molds are disposed have movement, the said trays being usually connected by links or flexible members, not shown, having projecting trunnions 65 which move in or have bearing on the track, as will be well understood by referring to my prior patents above noted. A step-by-step movement may be imparted to the conveyor by means of levers 66, which are adjustably pivoted at their lower extremities as at 67 to a suitable bracket 68, which may form part of or be adjustably attached to the frame at each side of the mechanism, said levers having rotatably mounted thereon cam rollers 69, movable in a cam track 70 formed in a cam disk or wheel 71, there being a cam disk or wheel for each lever, adjustably secured to the shaft 42 as by the hub 72 and screw 73. The levers 66 are preferably provided at one side of their upper extremities with adjustable pawls 74, pivoted as at 75, which abut against the projecting trunnions 65 when the levers are moved forwardly by the cams 71 and impart a step-by-step movement to the conveyor, and when the levers are moved rearwardly, the pawls 74 ride over the trunnions 65, the said pawls being mounted far enough outwardly from the upper ends of said levers to permit the latter to clear the trunnions.

The pitman 61 is preferably adjustably pivoted at its lower extremity, as at 76, to one extremity of a bar or lever 77, which may be adjustably fulcrumed as at 78, the opposite extremity of said lever 77 being provided with a cam roller 79, which engages a cam 80, adjustably secured to the shaft 42 as by the hub 81 and screw 82.

As hereinbefore noted, the extruding and preforming operations are performed practically simultaneously and by one assembly or structure. It may be desirable in some instances to use a separately mounted movable severing means in place of the stationary cutter shown in the present instance, or the severing means may be entirely dispensed with and the charge segregated through rotation of the mold and retraction of the plastic material, in which event the neck of the charge would be twisted and in a certain sense wrung off. However, I prefer to use one or more wires or cutters as in the present instance, mounted on a stationary yoke or bracket which may be adjusted relatively to the orifice opening 10 so that the wire or wires or other cutting elements will be substantially at the intermediate portion of the neck after extrusion of the charge and prior to or during the segregating operation. As will be understood, the molds may be rotated by means of the chucks and spindles, which in turn may be independently rotated by means of the motors 59, and the cam 70 may be adjusted on the shaft 42 so that the pitman 61 will raise the chucks to contact with the molds and raise and rotate the latter while the charge is being extruded thereon, or immediately after the lower portion of the charge contacts with the mold. This adjustment may also be effected by means of the adjusting nuts 62 on the upper extremity of the pitman 61 or the spindles may be adjusted independently at 60$^a$.

The block 34 may be adjusted on the ratchet bar 27 so that retraction of the plastic material from the orifice opening 10 will take place at such time as will prove most advantageous, and as the material is preferably extruded through the wires or cutters onto the mold and the latter rotated, that part of the charge, or the neck of the charge, immediately below the cutters will be twisted in a plane horizontal to the vertical axis of the orifice opening 10, which forms the neck of the charge, and thereby enable a clean cut to be formed, the retraction of the material assisting in this segregating operation.

From the foregoing, the operation of the improved mechanism should be readily understood. The feed blades 18 are actuated through the cam 39, lever or bar 29, ratchet bar 27, and gears 24 and 22 on the shaft 17, the various connections being adjustable to vary the size of the charge extruded into or on the mold. As heretofore noted, the spindles 57 and chucks 58 may be adjusted to raise and rotate the molds during extrusion, or the mold may remain at rest or stationary until the charge first contacts therewith, and then be raised and rotated. It is preferred to adopt the latter adjustment, so that at the time the charge is substantially completely extruded and segregated, the mold will be at approximately its highest point of rise, and the preforming member 43 may be adjusted so as to function at or about this time. The cams 71 and levers 66 may be adjusted to impart a step-by-step movement to the conveyor after the charge has been preformed and the mold lowered onto one of the trays of the conveyor to advance the mold with the preformed charge to a position to be acted upon by the profile and trimmer or the jiggering operation.

It may be desired to mount the drive shaft 42 and cam mechanism at either end of the jiggering means, and I have therefore shown a supporting or bearing bracket 42$^a$ at each end of the jigger frame, and which may be formed integral with or suitably secured to the latter.

Fig. 4 illustrates a modification in structure which may be adopted in the production of ware involving the use of deep molds. In this instance the orifice member 9$^a$ may be lengthened and formed with an attaching flange 9$^b$ at one side thereof, on which may be adjustably secured as by bolts 9ᶜ and shims 9ᵈ the preforming member 43ᵃ, which may be of the desired shape. This preforming member may also act to finally form the charge, or, if desired, a trimmer 52ᵇ may be adjustably mounted as at 52ᶜ to cooperate with the preforming member.

What is claimed as new is:

1. In mechanism of the class specified, means for extruding a charge of plastic material into or on a mold, and means for segregating and preforming the charge through rotation of the mold.

2. In mechanism of the class specified, means for extruding a pre-determined charge of plastic material directly into or on a mold, and stationary means for preforming and segregating the charge through rotation of the mold.

3. In mechanism of the class specified, means for extruding a predetermined charge of plastic material directly into or on a mold, preforming the charge, and segregating the charge through rotation and retraction.

4. In mechanism of the class specified, means for extruding a predetermined charge of plastic material directly into or on a mold, and means for segregating the charge by twisting a reduced portion thereof.

5. In mechanism of the class specified, means for extruding a predetermined charge of plastic material into or on a mold, and means for preforming and segregating the charge through rotation of the mold and retraction of the plastic material.

6. In mechanism of the class specified, means for extruding a predetermined charge of plastic material directly into or on a mold, and stationary means for preforming and segregating the charge by rotating the latter in a plane at right angles to the plane of extrusion.

7. In mechanism of the class specified, means for extruding a predetermined charge of plastic material directly into or on a mold, means for rotating the mold and means rendered operative through rotation of the mold for simultaneously segregating and preforming the charge.

8. In mechanism of the class specified, the combination with a conveyor for molds and jiggering mechanism, means for imparting a step-by-step movement to the conveyor, means for rotating the molds, means for extruding plastic material into or on the molds, and means rendered operative through rotation of the molds for preforming and segregating a charge of plastic material during one step-by-step movement of the conveyor.

9. In mechanism of the class specified, the combination with a conveyor for molds, of a container for plastic material, means in said container for extruding a predetermined charge of plastic material onto the molds, means for independently rotating the molds, and stationary means attached to the container for cooperating with the means for rotating the molds to segregate and preform the charges.

10. In mechanism of the class specified, the combination with a conveyor for molds and jiggering mechanism, of a container for plastic material, means in said container for extruding a predetermined charge of plastic material directly into or on a mold, means for retracting the plastic material in the container, and means cooperating with the retracting and jiggering means to segregate and preform the charge.

11. In mechanism of the class specified, the combination with a conveyor for molds and jiggering means, of an adjustable container for plastic material, adjustable means in said container for extruding predetermined charges of plastic material directly into or on the molds, adjustable means for retracting the plastic material in the container, and stationary preforming and segregating means adjustably mounted relatively to the container and jiggering means.

12. In mechanism of the class specified, the combination with a conveyor and jiggering mechanism, of a container for plastic material, means in said container for extruding the plastic material into or on molds in predetermined charge of bulbous form having a neck portion, adjustably mounted preforming means, and means for segregating the charges by a twisting and pulling action exerted on said neck portion.

13. A method of feeding and forming plastic material in the manufacture of pottery, which consists in extruding the material in predetermined charges and segregating each charge by rotation.

14. A method of feeding and forming plastic material in the manufacture of pottery, which consists in extruding in predetermined charges, and segregating and preforming by rotation of the charges.

15. A method of feeding and forming plastic material in the manufacture of pottery, which consists in extruding a predetermined charge directly into or on a mold, and segregating the charge by twisting and preforming the charge by rotation thereof.

16. A method of feeding and forming plastic material in the manufacture of pottery, which consists in extruding in predetermined charges, segregating by twisting and retraction, and preforming by rotation of the charge.

17. A method of feeding and forming plastic material in the manufacture of pottery, which consists in extruding in predetermined charges directly into or on a mold, preforming by extrusion and rotation, and segregating by twisting and retraction of the plastic material.

18. In mechanism of the class specified, the combination with a mold, of means for reciprocating and rotating the mold, a container for plastic material provided with means for extruding the material into or on the mold, and a stationary segregating member and shaping tool mounted adjacent the container and cooperating with the extruding means and rotating mold to segregate the material in charges and shape the latter into ware.

19. In mechanism of the class specified, the combination with a mold, of means for reciprocating and rotating the mold, a container for plastic material having a restricted outlet, means in said container for progressing the material through said outlet onto the mold in the form of a column, means for periodically severing the column, and a shaping tool mounted adjacent the container, the mold being elevated and rotated within operative adjacency to said tool to shape the material and assist in severing the column.

20. In mechanism of the class specified, the combination with a mold, of means for reciprocating and rotating the mold, a container for plastic material having a restricted outlet, rotating means in said container for progressing the material through said outlet onto the mold in the form of a column, means for periodically reversing the rotation of said latter means to retract the column to assist in segregating the material in charges, and a shaping tool mounted adjacent the container, the mold being elevated and rotated within operative adjacency to said tool to initiate shaping of the material while the latter is spreading over the mold and during severing of the column.

Signed by me this 10th day of January, 1927.

WILLIAM J. MILLER.